US011122309B2

(12) United States Patent
Levin et al.

(10) Patent No.: US 11,122,309 B2
(45) Date of Patent: Sep. 14, 2021

(54) SYSTEMS AND METHODS FOR DEACTIVATING PROBLEMATIC CONTENT

(71) Applicant: NBCUniversal Media, LLC, New York, NY (US)

(72) Inventors: Michael Levin, Jersey City, NJ (US); Christopher Lynn, Brooklyn, NY (US); Christopher Price, Nyack, NY (US); Richard Dale, Sunnyside, NY (US); Constantinos Hoppas, Mt Kisco, NY (US); Gianna DiGiovanni, Turlock, CA (US); Alexandra Paige, New York, NY (US)

(73) Assignee: NBCUniversal Media, LLC, New York, NY (US)

( * ) Notice: Subject to any disclaimer, the term of this patent is extended or adjusted under 35 U.S.C. 154(b) by 0 days.

(21) Appl. No.: 16/730,460

(22) Filed: Dec. 30, 2019

(65) Prior Publication Data

US 2021/0204009 A1 Jul. 1, 2021

(51) Int. Cl.
*H04N 21/24* (2011.01)
*H04N 21/81* (2011.01)

(52) U.S. Cl.
CPC ....... *H04N 21/2407* (2013.01); *H04N 21/812* (2013.01)

(58) Field of Classification Search
CPC ........... H04N 21/222; H04N 21/23424; H04N 21/235; H04N 21/2404; H04N 21/2407; H04N 21/25435; H04N 21/812
USPC ........................................................ 725/14
See application file for complete search history.

(56) References Cited

U.S. PATENT DOCUMENTS

| 7,266,726 B1 * | 9/2007 | Ladd ................... G06F 11/2268 714/27 |
| 9,009,834 B1 | 4/2015 | Ren et al. |
| 2006/0149623 A1 | 7/2006 | Badros et al. |
| 2008/0263673 A1 | 10/2008 | Brun et al. |
| 2012/0158954 A1 | 6/2012 | Heffernan et al. |

(Continued)

OTHER PUBLICATIONS

European Search Report; EP Application No. EP 20210806; dated Apr. 27, 2021.

*Primary Examiner* — Dominic D Saltarelli
(74) *Attorney, Agent, or Firm* — Fletcher Yoder, PC

(57) ABSTRACT

An apparatus, system and method for deactivating problematic secondary content are provided. This approach involves a deactivator component receiving data associated with an indication of a change to one or more secondary contents, a secondary content playback report, and/or a secondary content quality of experience (QoE) via data sources. After identifying the problematic secondary content, the deactivator component may request a secondary content provider to deactivate the problematic secondary content by deactivating a target resource associated with the secondary content instance, the secondary content, the secondary content unit, or the placement. In particular, the deactivator component may also provide feedback or reason for deactivating the secondary content. Incorporating a central component such as the deactivator component in a system that monitors quality of secondary component, ensures time and resource efficiency, reduces revenue loss for the secondary content provider, and maintains an uninterrupted experience for users when viewing secondary content.

20 Claims, 6 Drawing Sheets

(56) References Cited

U.S. PATENT DOCUMENTS

| | | |
|---|---|---|
| 2014/0164093 A1 | 6/2014 | Libman |
| 2015/0128162 A1 | 5/2015 | Ionescu |
| 2016/0162125 A1* | 6/2016 | Martella .............. G06F 3/0482 715/716 |
| 2016/0173553 A1* | 6/2016 | Panje ................ H04L 65/4092 709/219 |
| 2018/0270534 A1* | 9/2018 | Badawiyeh .......... H04N 21/472 |
| 2018/0376216 A1* | 12/2018 | Zhou ................ H04N 21/8456 |
| 2019/0188095 A1* | 6/2019 | Shen ................ G06F 11/2033 |

* cited by examiner

SYSTEMS AND METHODS FOR DEACTIVATING PROBLEMATIC CONTENT

BACKGROUND

The present disclosure relates generally to content provision. More particularly, the present disclosure relates to systems and method for deactivating problematic secondary content.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Secondary content providers often use quality control systems to monitor properties of secondary content (e.g., advertisements or any other secondary media content) before and after being deployed via secondary content presentation services. Present quality control systems may deactivate problematic secondary content via manual intervention when the problematic secondary content does not meet certain thresholds or requirements of the secondary content presentation services. Unfortunately, deactivating the problematic secondary content via manual intervention or without a centralized component that assesses problematic data, requests automatic deactivation of the problematic secondary content, and provides valuable feedback when the secondary content may be problematic or blocked by the secondary content presentations may result in a loss of time, resources, and revenue for the secondary content providers. For instance, the secondary content presentation services may not provide useful feedback when blocking certain secondary content, causing the secondary content providers to lose advertising opportunities. Additionally, manual intervention used to deactivate and replace the problematic secondary content may interrupt user experience when viewing content (e.g., T.V. shows, movies, or any other media content) and secondary content.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a deactivator component application programming interface (API), stored on a tangible, non-transitory, machine-readable medium, comprising the deactivator component API is configured to receive data via one or more data sources. The data comprises one or more of an indication of one or more changes to a secondary content, a secondary content playback report; and a secondary content quality of experience (QoE) indication. The deactivator component API identifies a problematic secondary content based on the data. In response to identifying the problematic secondary content, the deactivator component API provides a request to a secondary content provider to deactivate the problematic secondary content.

In a further embodiment, a system comprises one or more data sources that generate data associated with secondary content. The data comprises an indication of one or more changes to a secondary content, a secondary content playback report, a secondary content QoE indication, or any combination thereof. Additionally, the system comprises a deactivator service computer configured to identify problematic secondary content from the secondary content based upon the data. In response to identifying the problematic secondary content, the deactivator service computer provides a request to a secondary content provider to deactivate the problematic secondary content In an additional embodiment, a method for deactivating problematic secondary content is provided. In accordance with this method, a deactivator service running on a computer receives data associated with secondary content. The data comprises an indication of a problematic change to the secondary content; a secondary content playback report, indicating a problematic playback of the secondary content; a secondary content QoE indication, indicating a problematic QoE associated with the secondary content; or any combination thereof. The deactivator service identifies problematic secondary content of the secondary content based on the data received. The deactivator service requests a secondary content provider to deactivate the problematic secondary content.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
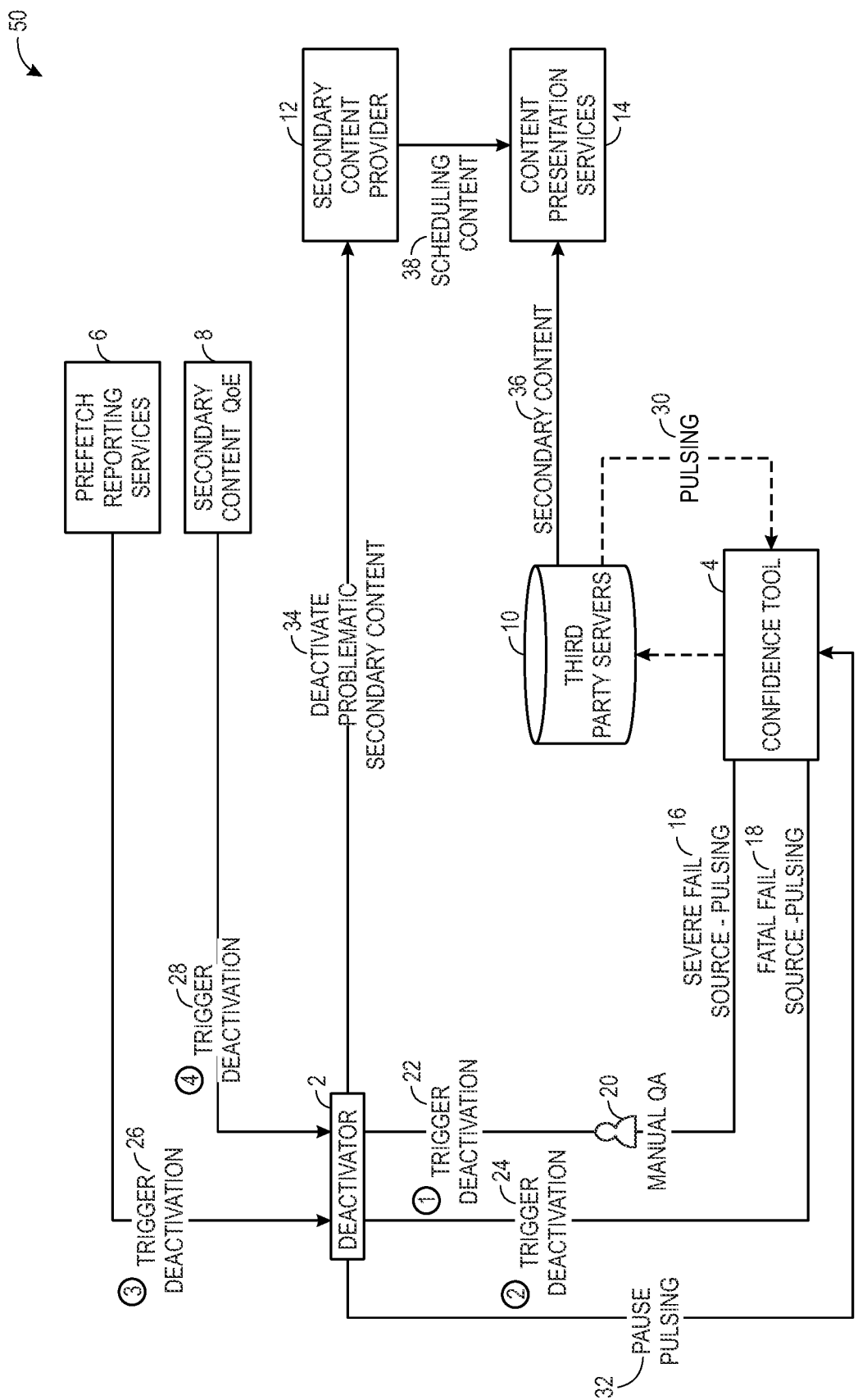
FIG. 1 illustrates a system that deactivates problematic secondary content, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. It should be noted that the term "multimedia" and "media" may be used interchangeably herein.

As discussed in greater detail below, the present embodiments described herein improve efficiencies in deactivating problematic secondary content. Due to the growing amount of data sources, which may monitor secondary content (e.g., advertisements, commercial notices, marketing content, or another suitable secondary media content), monitoring secondary content in an efficient manner such that it meets the specifications of content presentation services continues to pose problems despite manual intervention efforts to deactivate the problematic secondary content. As a result, a system that automatically deactivates problematic secondary content and provides a secondary content provider useful feedback when the problematic secondary content is blocked may improve user experience in relation to viewing secondary content and enhance revenue gains for the secondary content provider. The system may include data sources, such as a confidence tool, a prefetch reporting service, a secondary content QoE, and any combination thereof to identify the problematic secondary content. The confidence tool may identify problematic changes to secondary content via a pulsing mechanism, in which secondary content is identified for deactivation until changes to the secondary content meet the specification of the content presentation services. Other ways to identify problematic secondary content are also available. For example, the prefetch reporting service may identify problematic changes to secondary content based on determining whether a ratio of the number of secondary content expected to play and the number of secondary content actually played is within a threshold range. The secondary content QoE may identify problematic changes to secondary content based on determining whether secondary content QoE statistics, which may also be referred to video QoE statistics (e.g., video start time(s), buffering ratio(s), and/or video start failure(s)), meet the specifications of the content presentation services.

After the problematic secondary content has been identified, the data sources may send indications of problematic secondary content as trigger deactivations to a deactivator component. The deactivator component may determine which particular secondary content may be problematic, when the particular secondary content became problematic, and why the particular secondary content may be problematic. A deactivator API (application program interface) manages the functionality of the deactivator component based on receiving data associated with target resources such as a secondary content, a placement, a secondary content unit. The deactivator API also receives a reason or cause for invoking it. Based on such data, the deactivator component may request the secondary content provider to deactivate the identified problematic secondary content by deactivating a target resource associated with the problematic secondary content. By deactivating the target resource associated with the secondary content, the secondary content itself may be deactivated to remove the problematic secondary content. By deactivating the target resource associated with the placement, the placement that contains the problematic secondary content may be deactivated to remove the problematic secondary content. Another attempt of deactivation involves deactivating target resources associated with the secondary content or the placement.

With the preceding in mind, the following figures relate to the system and process of deactivating problematic secondary content. Turning now to FIG. 1, a schematic diagram of an embodiment of a system 50 where embodiments of the present disclosure may operate, is illustrated. The system 50 may include a deactivator component 2 that may be an application program interface (API) designed to automatically deactivate problematic secondary content and provide a notification (e.g., to a sales team of a secondary content provider 12) by providing useful feedback regarding the problematic secondary content. As used herein, the term API may be defined as a communication protocol between a client and a server or in other words an interface implemented by an application, which allows other applications to communicate with it. An API may include a set of functions, methods, classes, or protocols that an operating system, library, or service provides to support requests made by computer programs. As will be described in more detail below, the deactivator component 2 may trigger deactivations based on an indication of a modification or problems with the secondary content that is provided via one or more data sources. The data sources may include a confidence tool 4, a prefetch reporting service 6, a secondary content QoE 8, and/or any combination thereof.

In one embodiment, the deactivator component 2 may receive an indication of problematic changes to secondary content via the confidence tool 4. The confidence tool 4 may receive secondary content from third party servers 10 that provide secondary content to content presentation services 14. In some instances as indicated by arrow 36, the secondary content provider 12 may have employed the third-party servers 10 to create secondary content based on the needs of the secondary content provider 12. As indicated by arrow 38, the secondary content provider 12 controls which secondary content is deployed and when the secondary content is deployed to the content presentation services 14, or in other words regulates scheduling information (e.g., duration of secondary content, tracking beacons associated with the secondary content, media type associated with the secondary content) provided to the secondary content presentation services 14. The third-party servers 10 may be associated with creative or ad agencies that create marketing campaigns, ads, secondary video content, or secondary audio content tailored to meet client needs. In some cases, the secondary content received by the confidence tool 4 from the third-party servers 10 may not be live yet, or in other words has not been presented by content presentation services 14. The confidence tool 4 may serve as a quality control mechanism for such pre-live secondary content as well as for content that is already live. The confidence tool 4 performs pulsing 30, a mechanism that programmatically determines any changes made to received secondary content. Pulsing 30 may be performed on a continuous or periodic basis (every 100 milliseconds, 1 second, 5 seconds, or any suitable time period). The pulsing 30 operation may check to determine whether various attributes of the secondary content abide by certain quality criteria (e.g., criteria of the secondary content provider 12 and/or an entity commissioning the creation/editing of the secondary content).

When the quality criteria are not met, the confidence tool 4 may provide an indication to the deactivator component 2, triggering deactivation of the secondary content that does not meet the quality criteria. In some instances, different types of deactivation triggers may be provided to the deactivator component 2. In some embodiments different trigger levels may be implemented to indicate a severity or other characteristics of the problematic secondary content. In the depicted embodiment, the confidence tool 4 may invoke the deactivator component 2 via a first trigger deactivation 22 or a second trigger deactivation 24. The first trigger deactivation 22 is based on problematic secondary content related to a severe fail 16 that, while may still allow playback of the secondary content, may eventually lead to a fatal failure where playback is blocked. Examples of problematic secondary content associated with the severe fail 16 may include severe pixilation issues or spikes in audio. In some instances, problematic secondary content associated with the severe fail 16 may involve manual intervention 20. For instance, if a problematic secondary content may be susceptible to spikes in audio, a person may be assigned to listen to and investigate particular regions of the secondary content for any spikes in audio. Meanwhile, the second trigger deactivation 24 is based on problematic secondary content related to a fatal fail 18. Examples of the fatal fail 18 may include bit rate issues with the problematic secondary content or broken uniform resource locator (URL) associated with the problematic secondary content. For example, after selecting a URL, information regarding the secondary content is absent due to a domain or vendor issue. As a result, the secondary content may be identified as problematic and be an example of the fatal fail 18. A more in-depth discussion entailing how the confidence tool 4 identifies problematic secondary content and sends the first trigger deactivation 22 or the second trigger deactivation 24 to the deactivator component 2 will be provided below.

Along with the confidence tool 4, another data source that enables the deactivator component 2 to request deactivation of problematic secondary content includes the prefetch reporting service 6. The prefetch reporting service 6 generates or updates a secondary content playback report based on data issued by the secondary content provider 12 on a periodic basis (e.g., daily or any suitable time period). For example, the secondary content playback report may contain data associated with the previous 32 hours or any suitable time period of secondary content playback. The secondary content playback report may include information related to the number of requests associated with the secondary content (e.g., the amount of secondary content expected to play) and the number of refreshes associated with the secondary content (e.g., the amount of secondary content actually played). Based on the information within the secondary content playback report, the prefetch reporting service 6 may invoke the deactivator component 2 via a third deactivation trigger 26. For example, in some embodiments, if the ratio of an expected amount of a piece of secondary content to be played to the amount of the piece of secondary content that is actually played exceeds a prescribed threshold, this may indicate that the piece of secondary content should be deactivated, as there is a discrepancy between the expected and actual playback (e.g., which may be caused by refusal of playback by the secondary content provider 12). The ratio can be inversed as well (amount of secondary content actually played compared to the amount of secondary content expected to be played) in which case the secondary content may be deactivated if the ratio is below a predetermined threshold.

In another embodiment, a fourth deactivation trigger 28 may invoke the deactivator component 2. The fourth deactivation trigger 28 may be generated by a secondary content QoE 8. In some examples, the secondary content QoE 8 may be referred to as video QoE. The statistics associated the secondary content QoE 8 may help the deactivator component 2 identify and request deactivation of the problematic secondary content. The secondary content received by the secondary content QoE 8 as well as by the prefetch reporting service 6 has been live, or in other words has been presented by content presentation services 14. Like the confidence tool 4, further details on how the prefetch reporting service 6 and the secondary content QoE 8 may enable the deactivator component 2 to deactivate problematic secondary content will be discussed below. The data sources described above may not be limited to those discussed herein but rather the confidence tool 4, the prefetch reporting service 6, and the secondary content QoE 8 are examples of data sources. As indicated by arrow 34, the deactivator component 2 may request to the secondary content provider 12 to deactivate the problematic secondary content based on the trigger deactivations 22, 24, 26, 28, and any combination thereof.

The deactivator component 2 may request to deactivate problematic secondary content based on target resources, which may include a secondary content instance, a secondary content, a secondary content unit, a placement, or any combination thereof. For example the deactivator component 2 may request to deactivate the problematic secondary content by deactivating the secondary content itself. In a further embodiment the deactivator component 2 may request to deactivate either the secondary content instance, the secondary content, the secondary content unit or the placement. In some embodiments, secondary levels of deactivation may be implemented as a failover. In such embodiments, if deactivation at one level of granularity fails for some reason, one or more other deactivations specifying a different level of granularity may be attempted.

Once problematic secondary content has been deactivated, it may be unnecessary to check the secondary content for problems again until the problems with the content have been fixed. In one embodiment, if the problematic secondary content has been successfully deactivated, then the deactivator component 2 may request the confidence tool 4 to pause pulsing of the now deactivated problematic secondary content as indicated by arrow 32. Subsequently, prior to re-activation of the content (e.g., after fixing the problems with the content), the pulsing may be re-activated.

Figure 2:
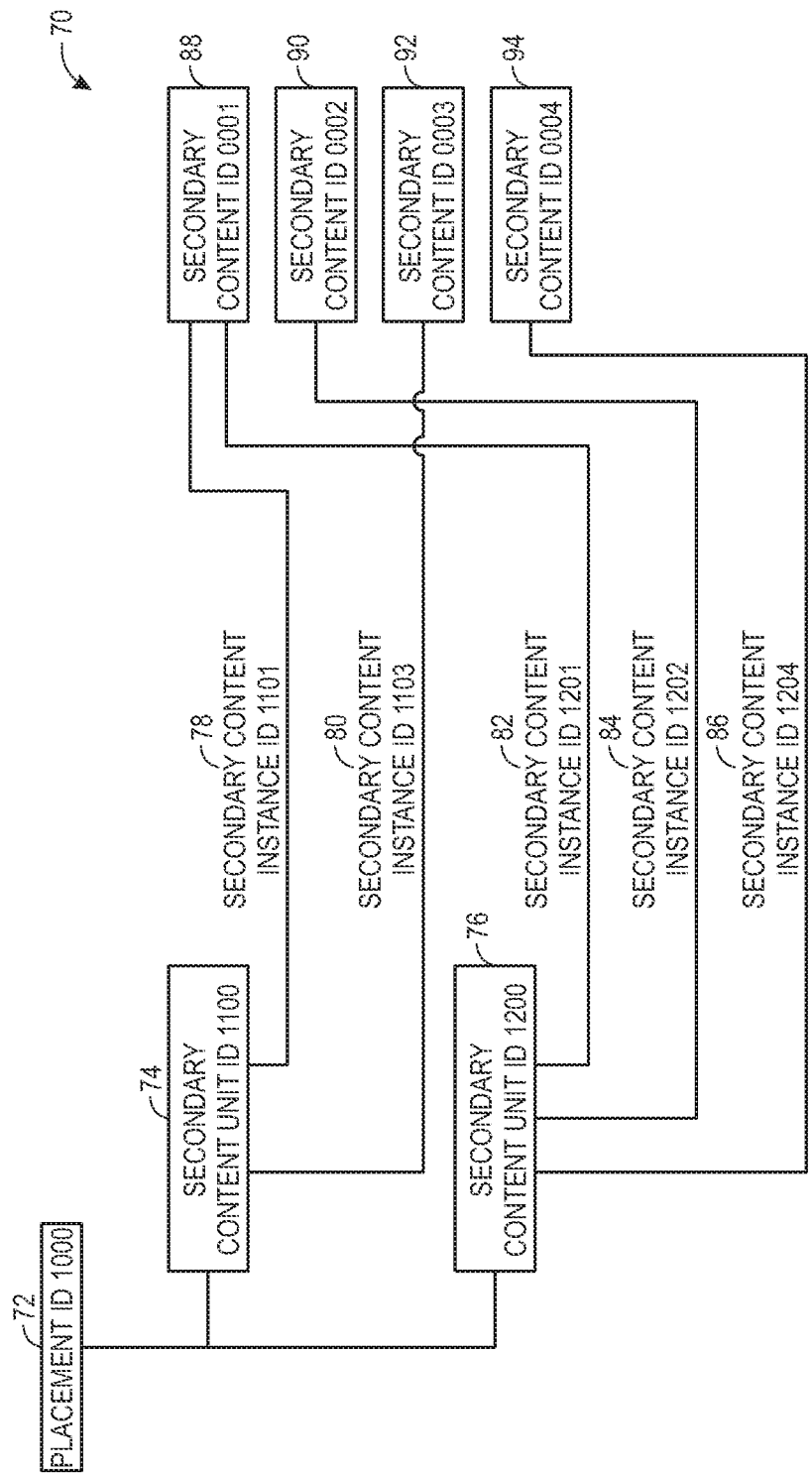
FIG. 2 is a schematic diagram, depicting one or more target resources associated with varying levels of granularity, in accordance with an embodiment of the present disclosure.

As described herein, target resources are the items to be deactivated by the deactivator component 2. The target resources may be defined at varying levels of granularity, which may help the deactivator component 2 with flexible deactivation of content. The varying levels of granularity in defining the target resources are discussed in detail with reference to FIG. 2. FIG. 2 is a schematic diagram 70 illustrating possible levels of granularity in defining the one or more target resources. In particular, the depicted embodiment illustrates secondary content instances 78, 80, 82, 84, and 86; secondary contents 88, 90, 92, and 94; secondary content units 74 and 76; and placement 72, each of which could be a level of granularity with which to define the target resources for deactivation. In this manner, as will be discussed in more detail below, the deactivator component 2 may deactivate content globally (e.g., via deactivation of the secondary content 88, 90, 92, and/or 94), a particular instance of the secondary content (e.g., via the secondary content instance 78, 80, 82, 84, and/or 86), for a particular secondary content unit (e.g., via the secondary content unit 74 and/or 76), and/or for an entire campaign (e.g., via the placement 72). Each of these varying levels of granularity is described below.

The placement 72 may be defined as scheduling (e.g., flight dates) or targeting parameters associated with secondary contents 88, 90, 92, and 94 within a secondary content campaign, which may be a series of secondary content for a particular theme or marketing platform. Each placement may be associated with a unique ID such as ID "1000" associated with the placement 72. In some embodiments, a target resource may be defined by the placement 72, thereby deactivating the entire placement to deactivate the problematic secondary content. The target resource, when associated with the placement 72 may be associated with the lowest level of granularity in comparison to target resources associated with the secondary content instances 78, 80, 82, 84, and 86; the secondary contents 88, 90, 92, and 94; and the secondary content units 74 and 76. Each placement such as the placement 72 may contain one or more secondary content units (e.g., the secondary content units 74 and 76).

The secondary content units 74 and 76 may be a particular unit within the placement 72 that may be associated with a type of secondary content product. The secondary content units 74 and 76 may be associated with different types of secondary content product. For example, the secondary content unit 74 may define content to serve within a first position at the placement 72 (e.g., pre-roll position), and the other secondary content unit 76 may define content to serve within a second position (e.g., mid-roll position or a post-roll position). Each secondary content unit may be associated with a unique ID such as ID "1100" associated with the secondary content unit 74. In some embodiments, a target resource associated with the secondary content units 74 and 76 may be deactivated to remove the problematic secondary content. Because the secondary content units may be associated with multiple secondary content instances, multiple secondary content instances may be deactivated when defining the target resources as the secondary content unit 74 and/or 76. Thus, as may be appreciated, defining target resources by the secondary content unit 74 and/or 76 is somewhat more granular than defining the target resources based upon the placement 72.

In some instances, still a higher degree of granularity may be desired. Thus, in some instances, the target resources may be defined based upon the secondary content 88, 90, 92, and/or 94, using the secondary content identifier. At this level of granularity, a specific piece of secondary content 88, 90, 92, and/or 94 may be deactivated based upon the secondary content identifier. The secondary contents 88, 90, 92, and 94 may include secondary media content such as audio content (e.g., music), video content (e.g., advertisements, commercials), and/or other forms of media content. Each secondary content 88, 90, 92, and 94 may be associated with a unique ID, which may be designated by the secondary content provider 12. For example, secondary content 88 may be associated with ID "0001" or any suitable type of ID. In some embodiments, a target resource associated with the secondary contents 88, 90, 92, and 94 may be deactivated to remove the problematic secondary content.

Further, when a greater degree of granularity is desired, the target resources may be defined with respect to a particular secondary content instances 78, 80, 82, 84, and 86. Each secondary content instance specifies a particular instance of use of a secondary content. The secondary content instances may be associated with a unique ID, which, in some instances, may be designated by the secondary content provider 12. For example, secondary content instance 78 may be associated with ID "1101" or any suitable type of ID. The unique ID associated with the secondary content instance may be generated based on the combination of the unique ID associated with the secondary contents 88, 90, 92, and 94 and the unique ID associated with the secondary content units 74 and 76. In some embodiments, a target resource associated with the secondary content instances 78, 80, 82, 84, and 86 may be deactivated to remove the problematic secondary content.

In one embodiment, the problematic secondary content may be deactivated based on a particular target resource with a particular level of granularity. In another embodiment, the problematic secondary content may be deactivated via a failover based on an attempt to deactivate one or more target resources associated with varying levels of granularity. More details on deactivating problematic secondary content based on target resources associated with varying levels of granularity will be provided below.

Keeping in mind the relationship between the target resources, the deactivator component 2 may request to deactivate problematic secondary content based on deactivating a target resource associated with the secondary content instance, the secondary content, the secondary content unit, the placement, or a combination thereof.

TABLE 1

Deactivation Signaling Parameters

| Parameter | Description |
| --- | --- |
| SecondaryContentID (creativeID) | Secondary content is a presentation of media, particularly ads. SecondaryContentID is a unique ID from secondary content provider representing unique secondary content |
| placementID | Placement is combination of sold offerings (e.g., ad offerings) with flight dates & targeting parameters. placementID is a unique ID from secondary content provider representing a placement in a campaign (e.g., ad campaign) |
| SecondaryContentUnitID (AdUnitID) | SecondaryContentUnitID describes the type of product. SecondaryContentUnitID is a unique ID from secondary content provider tied to a specific unit (e.g., an ad unit) within a placement |

TABLE 1-continued

Deactivation Signaling Parameters

| Parameter | Description |
| --- | --- |
| SecondaryInstanceID (CreativeInstanceID) | SecondaryInstanceID is a unique ID generated when a unique SecondaryContentID is associated to a unique SecondaryContentUnitID |

Table 1 above summarizes the deactivation parameters that may be utilized in a trigger deactivation message (e.g., the trigger deactivation 22, the trigger deactivation 24, the trigger deactivation 26, and/or the trigger deactivation 28). As an example, when secondary content fails pulsing, causing an API call to be made from the confidence tool 4 (or another source discussed above), to the deactivator component 2 to remove the secondary content from circulation, the API call from the confidence tool 4 will be send to the deactivator component 2 and contain a header and a body. The header may be an API key, such as x-api-key: someAPIKeyabc123, identify the API from which the message originated. The body may include one or more of the parameters from Table 1. The body may provide one or more IDs that can be used to identify the secondary content for deactivation along with a reason for deactivation. In one example, the body may include the following information: SecondaryContentID: "2460781", placementID: "35281782", SecondaryContentUnitID: "35281825", cause: "Failed Pulsing"}. While these parameters are discussed with respect to the trigger deactivation message originating from the data sources such as the confidence tool 4, the prefetch reporting services 6, the secondary content QoE 8, one or more of the parameters may also be provided in the messaging from the deactivator component 2 to the secondary content provider 12 in FIG. 1. The message from the deactivator component 2 may similar content the reason for the deactivation as provided by the data sources.

Figure 3:
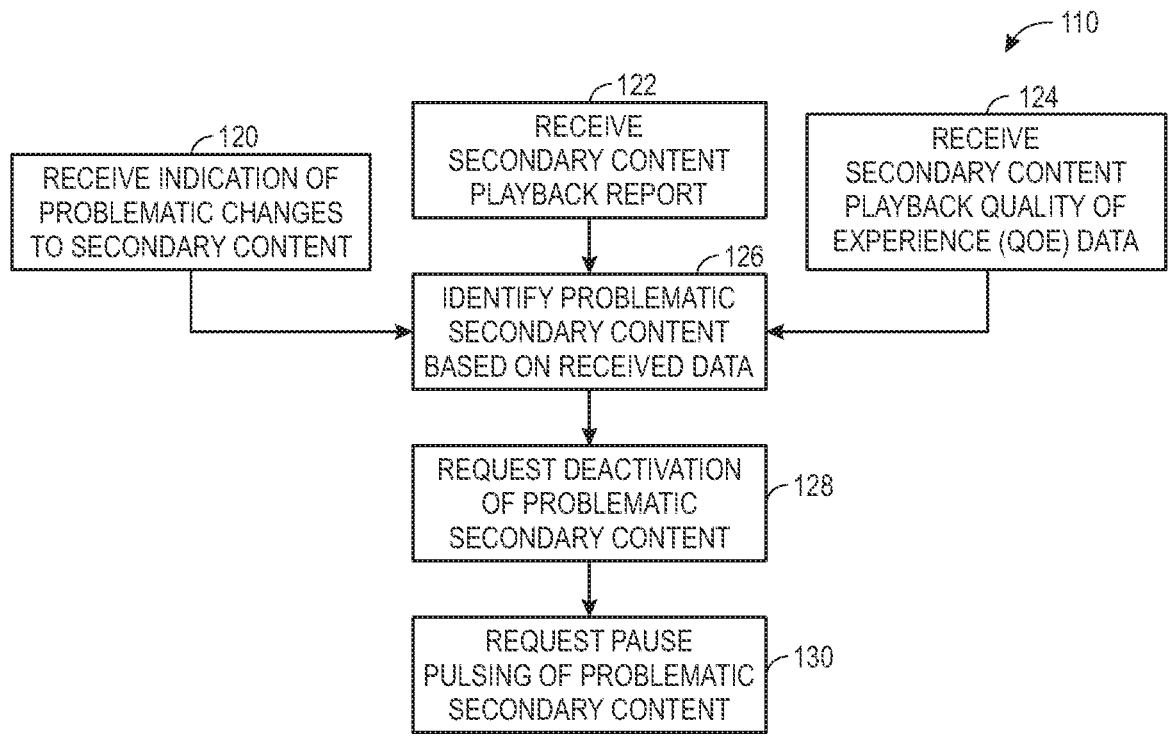
FIG. 3. is a flow chart associated with deactivating problematic secondary content, in accordance with an embodiment of the present disclosure.

Turning to FIG. 3, a flowchart that illustrates the process 110 associated with deactivating problematic secondary content begins with the deactivator component 2 receiving data from one or more data sources. In one embodiment, the deactivator component 2 may receive an indication of problematic changes to the secondary content (block 120) via the confidence tool 4. The indication may include, for example, bit rate changes, resolution changes, etc., which may not abide by requirements set by the secondary content provider 12 and/or the content presentation services 14.

In some embodiments, the deactivator component 2 may receive a secondary content playback report (block 122) via the prefetch reporting service 6. The secondary content playback report may include an indication of an expected number of playbacks of the secondary content and an actual number of playback of the secondary content.

In some embodiments, the deactivator component 2, may receive secondary content playback quality of experience QoE data (block 124) via the secondary content QoE 8. The QoE data may include, but are not limited to, video start time(s), buffering ratio(s), and video start failure(s).

As described in detail below, the deactivator component 2 may identify and request deactivation of problematic secondary content based on data received from the confidence tool 4, the prefetch reporting service 6, the secondary content QoE, and any combination thereof (block 126).

After identifying the problematic secondary content, the deactivator component 2 may request the secondary content provider 12 to deactivate the problematic secondary content (block 128). Sending a request to deactivate the problematic secondary content may include providing the secondary content provider 12 with information regarding which particular secondary content to deactivate. The process of deactivation may involve more than one attempt. In one embodiment, the deactivator component 2 may request to deactivate the problematic secondary content by deactivating the secondary content itself. This may be an example of deactivating a target resource associated with the secondary content. In another embodiment, the deactivator component 2 may request to deactivate the problematic secondary content by deactivating the placement that contains the problematic secondary content. This may be an example of deactivating a target resource associated with the placement. In a further embodiment, the deactivator component may request to deactivate the problematic secondary content by either deactivating the secondary content or the placement. This may be an example of deactivating a target resource associated with either the secondary content or the placement.

After a deactivation attempt (whether or not it is successful), the deactivator component 2 may display the target resource(s) (e.g. secondary content, secondary content ID, placement ID, secondary content unit ID, secondary content instance ID) associated with the problematic secondary content, status of deactivation and corresponding feedback related to cause for requesting deactivation, and any errors for further analysis if applicable. In one embodiment, if deactivating the problematic secondary content is successful, then the deactivator component 2 may optionally request the confidence tool 4 to pause pulsing of the secondary content (block 130). The confidence tool 4 may pause pulsing since monitoring changes to the secondary content and determining whether the changes meet specifications of the content presentation services 14 may no longer be a concern as the problematic secondary content has been deactivated. Pausing pulsing frees up resources and memory within the confidence tool 4. In another embodiment, after the problematic secondary content has been successfully deactivated, the deactivator component 2 may request the confidence tool 4 to pulse the secondary content again before re-activating the secondary content and after the secondary content presentation provider 12 confirms any new changes or updates to the secondary content that may not meet the specifications of the content presentation services 14.

Figure 4:
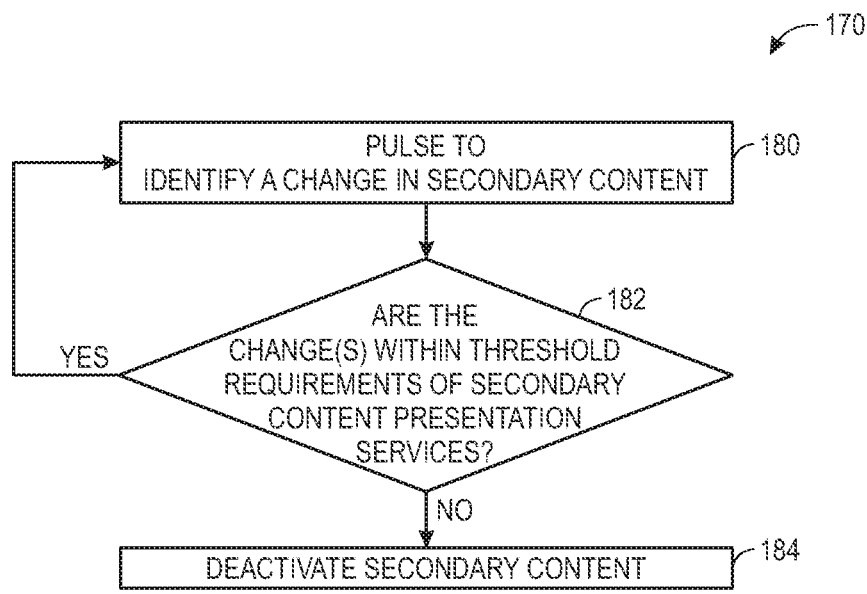
FIG. 4 is a flow chart associated with deactivating the problematic secondary content based on identifying problematic changes to secondary content, in accordance with an embodiment of the present disclosure.

As mentioned above, a more detailed discussion entailing how the confidence tool 4 identifies problematic secondary content and sends the first trigger deactivation 22 or the second trigger deactivation 24 will be discussed now. FIG. 4 is a flowchart 170 associated with deactivating secondary content based on the confidence tool 4 identifying problematic changes to secondary content. The confidence tool 4 may pulse to identify changes in secondary content (block 180).

A determination may be made as to whether the changes are within threshold requirements of the secondary presentation services (decision block 182). Examples of such requirements of secondary content presentation services 14 include but are not limited to minimum bit rate, aspect ratio, resolution, frame rate, color space, and format specifications. In some embodiments, the threshold requirements may be set by modeling or simulation techniques based on analyzing a history or record of data collected from the secondary content presentation services 14. In some embodiments, the threshold requirements may be set by requirements or other criteria of the secondary content provider 12 or an entity commissioning the secondary content.

If changes are present and the confidence tool 4 determines that the changes meet the threshold requirements of the secondary content presentation services 14, then the confidence tool 4 may simply continue pulsing for any other changes (block 180). However, if the confidence tool 4 determines that the changes do not meet the threshold requirements of the secondary content presentation services 14, then the deactivator component 2 may request to deactivate the secondary content that is problematic (block 184), by providing the first trigger deactivation 22 or the second trigger deactivation 24 to the deactivator component 2.

As mentioned previously, the first trigger deactivation 22 is based on problematic secondary content related to the severe fail 16 that may involve manual intervention. Examples of problematic secondary content associated with the severe fail 16 may include severe pixilation issues or in spikes of audio. Meanwhile, the second trigger deactivation 24 is based on problematic secondary content related to the fatal fail 18. Examples of the fatal fail 18 may include bit rate issues with the problematic secondary content or a broken URL associated with the problematic secondary content.

Figure 5:
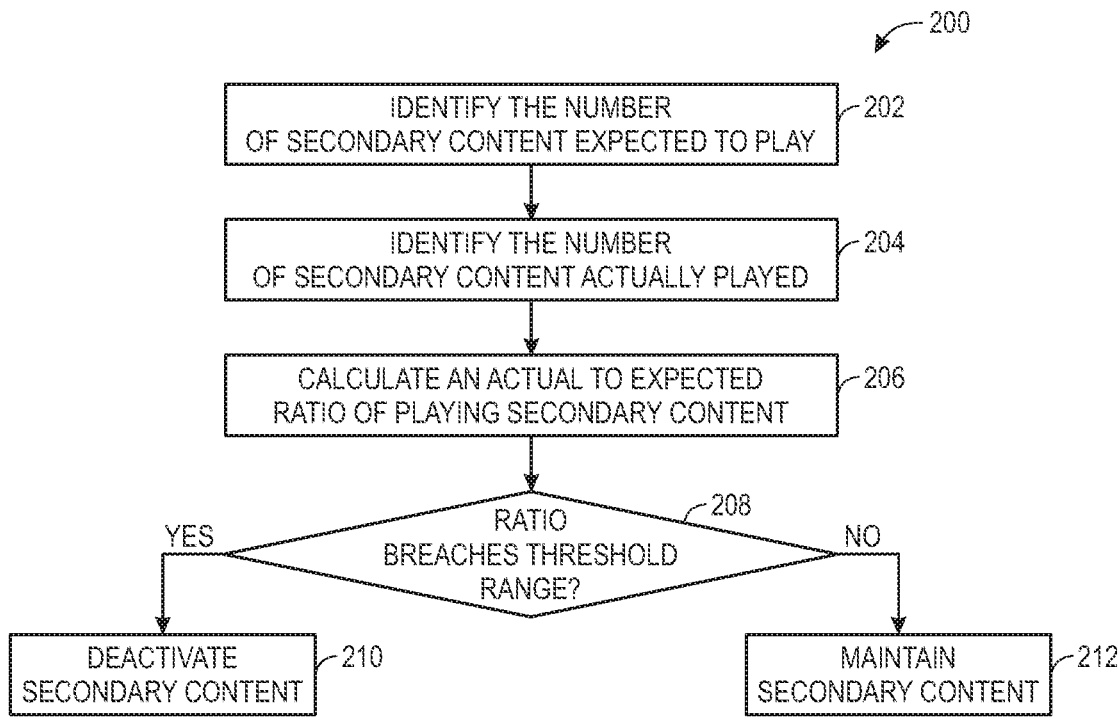
FIG. 5 is a flow chart associated with deactivating the problematic secondary content based on a secondary content playback report, in accordance with an embodiment of the present disclosure.

With the preceding in mind, FIG. 5 is a flow chart 200 associated with identifying problematic secondary content based on a secondary content playback report. The secondary content playback report may be updated or generated by the prefetch reporting service 6 on a periodic basis (daily, or any suitable time period).

The process 200 may include identifying the number of secondary content expected to play (block 202). For example, the number of secondary content expected to play may be identified based upon expected playback within a time interval (such as within an hour, a day, or any other suitable time period). The number of secondary content expected to play may be identified from statistics provided by the prefetch reporting service 6 (e.g., provided in a secondary content playback report).

Additionally, the process 200 may include identifying the number of secondary content actually played (block 204). This number may be identified based upon a playback time interval that is the same as that used in block 202 (such as within an hour, a day, or any other suitable time period). This number may also be provided as statistics information from the prefetch reporting service 6 (e.g., provided in the secondary content playback report).

The number of secondary content expected to play may be referred to as the number of requests associated with the secondary content while the number of secondary content actually played may be referred to as the number of refreshes associated with the secondary content. Such data may be collected by the secondary content provider 12 periodically (every second, every minute, or any other suitable time period) or real-time. After collecting such information, the secondary content provider 12 may send this information to the prefetch reporting service 6.

Based on the data received from the secondary content provider 12, a ratio between the number of secondary content expected to play and the number of secondary content actually played may be calculated (block 206). If the ratio breaches a threshold range (block 208), then the prefetch reporting service 6 may transmit the third deactivation trigger 26 to cause the deactivator component 2 to request deactivation of the secondary content (block 210) deemed to be problematic. However, if the ratio does not breach the threshold range (block 208), then the secondary content placement may be maintained, thus, not transmitting the third deactivation trigger 26, and thereby not invoking the deactivator component 2 (block 212). The threshold range may be determined based on a history of data related to the number of refreshes and requests associated with one or more secondary content, which may be collected by the secondary content provider 12.

Figure 6:
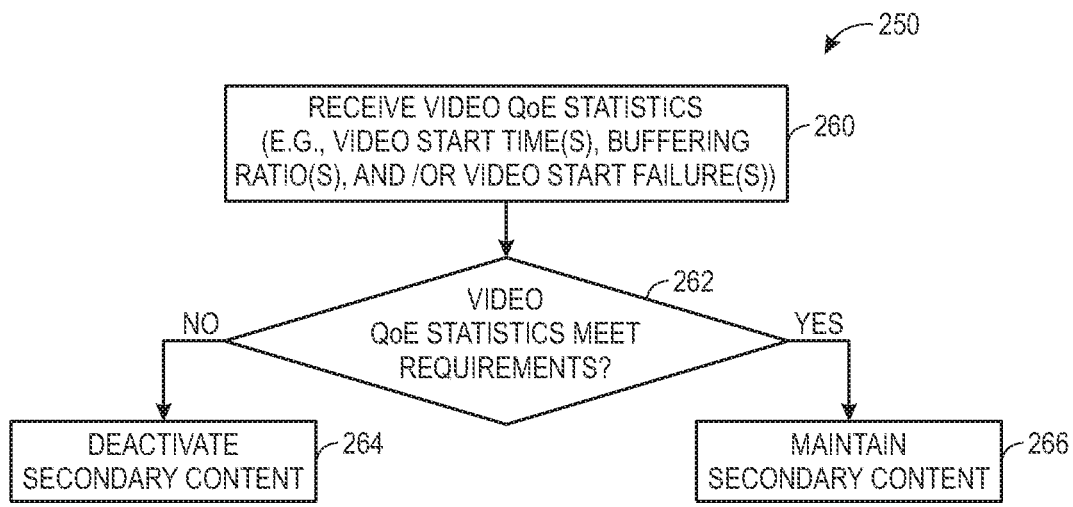
FIG. 6 is a flow chart associated with deactivating the problematic secondary content based on secondary content quality of experience (QoE) data, in accordance with an embodiment of the present disclosure.

Another data source that may invoke the deactivator component 2 via the fourth deactivation trigger 28 may be the secondary content QoE 8. Hence, FIG. 6 is a flow chart 250 associated with identifying problematic secondary content based on secondary content QoE data or statistics. In particular, the secondary content QoE 8 may receive video statistics (block 260) from the secondary content provider 12. The video statistics may include, but are not limited to, video start time(s), buffering ratio(s), and video start failure (s). When these video statistics do not meet certain requirements, this may indicate problematic secondary content that should be deactivated. The requirements may be set by modeling or simulation techniques based on analyzing a history or record of data collected from the secondary content presentation services 14 and/or secondary content provider 12.

If these video statistics do not meet the requirements of the secondary content presentation services 14 (decision block 262), then the secondary content QoE 8 may issue the fourth deactivation trigger 28 such that the deactivator component 2 may request to deactivate the secondary content, which is deemed problematic (block 264).

However, if the video statistics do meet the requirements of the secondary content presentation services 14 (decision block 262), then the deactivator component 2 may not be activated via the fourth deactivation trigger 28 (block 266).

Figure 7:
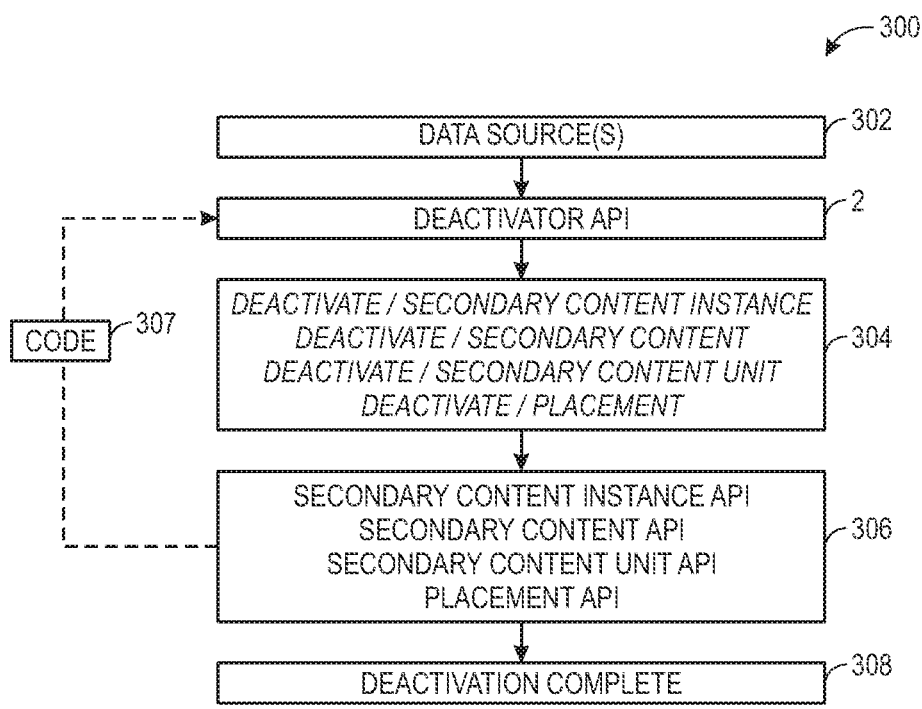
FIG. 7 is a block diagram associated with a system for deactivating the problematic secondary content based on a particular target resource associated with a particular level of granularity, in accordance with an embodiment of the present disclosure.

The discussion for the remaining figures will entail how a problematic secondary content may be deactivated. Turning to FIG. 7, a system 300 is depicted, in which the problematic secondary content is deactivated by the deactivator component requesting to deactivate a particular target resource (e.g., secondary content instance, secondary content, secondary content unit, and placement). The deactivator component 2, which may be an API gateway connecting to APIs of one or more secondary content providers 12 to deactivate secondary content at the secondary content providers 12, may also be referred to as the deactivator API 2. The process of deactivation involves the deactivator API 2 determining which target resource to deactivate. In one embodiment, based on receiving an indication of the problematic secondary content via one or more data sources 302 (the confidence tool 4, the prefetch reporting service 6, and/or the secondary content QoE 8), the deactivator component 2, may request the secondary content provider to deactivate the problematic secondary content by deactivating the target resource associated with the secondary content. Deactivating the secondary content may be useful in situations when a placement may contain multiple secondary contents. If one of the multiple secondary contents is determined to be problematic, then the deactivator component may request to deactivate the secondary content that is problematic. The remaining problem free secondary content contained within the placement may continue to play and remain untouched by the deactivator API 2.

As a result, the deactivator API 2 may invoke a functional endpoint 304 associated with deactivating the secondary content, specifying an identifier of the secondary content (e.g., a secondary content identifier). An example of this functional endpoint may be /deactivate/secondary content, /deactivate/creative, or any other endpoint utilized by an API to deactivate secondary content. In response to the deactivator API 2 invoking the functional endpoint associated with deactivating the secondary content via a secondary content API 306, the secondary content provider 12 may send the deactivator API 2 code 307 containing data about the secondary content, indicating a status of the secondary content after a deactivation attempt. The code 307 may be an XML, string. Based on the data received from the API associated with the secondary content provider 12, the deactivator API 2 may validate the status of the secondary content. If the deactivator API 2 receives an inactive status tag such as "IN_ACTIVE" associated with the secondary content, then the deactivator API 2 was successful in deactivating the secondary content that was identified as problematic. However, if the deactivator API 2 receives an active status tag such as "ACTIVE" associated with the secondary content, then the deactivator API 2 was not successful in deactivating the secondary content that was identified as problematic. Additionally, if the deactivator API 2 is unsuccessful in deactivating the secondary content that was identified as problematic, it may also provide information regarding any errors found in the process of deactivating the secondary content. At this point the deactivation completes, as indicated by block 308.

In another embodiment, the deactivator API 2 may request to deactivate the problematic secondary content by deactivating the placement in which the problematic secondary content resides. Based on receiving an indication of the problematic secondary content via one or more data sources 302, the deactivator API 2, may request the secondary content provider to deactivate the problematic secondary content by deactivating the target resource associated with the placement. Deactivating the placement may be useful in situations when a placement may contain a single secondary content. If the single secondary content is determined to be problematic, then the deactivator component may request to deactivate the placement that contains the problematic secondary content. Since no other secondary content is problematic because the placement contains one piece of secondary content, it may be useful to simply deactivate the placement that contains the secondary content.

As a result, the deactivator API 2 may invoke a functional endpoint 304 associated with deactivating the placement, providing a placement identifier. An example of this functional endpoint may be/deactivate/placement or any other API endpoints for deactivating placements. In response to the deactivator API 2 invoking the functional endpoint associated with deactivating the placement via a placement API (block 306), an API associated with the secondary content provider 12 sends the deactivator API 2 code 307 containing data indicative of the placement status after a deactivation attempt. The code 307 may be an XML, string. Based on the data received from the API associated with the secondary content provider 12, the deactivator API 2 may validate the status of the placement. If the deactivator API 2 receives an inactive status tag such as "IN_ACTIVE" associated with the placement, then the deactivator API 2 was successful in deactivating the placement that contains the problematic secondary content. However, if the deactivator API 2 receives an active status tag such as "ACTIVE" associated with the placement, then the deactivator API 2 was not successful in deactivating the placement that contains the problematic secondary content. Additionally, if the deactivator API 2 is unsuccessful in deactivating the placement that contains the secondary problematic content, it may also provide information regarding any errors found in the process of deactivating the secondary content. At this point the deactivation is complete, as indicated by block 308.

In a further embodiment, the deactivator API 2 may request to deactivate the problematic secondary content by deactivating the secondary content instance. Based on receiving an indication of the problematic secondary content via one or more data sources 302, the deactivator API 2, may request the secondary content provider to deactivate the problematic secondary content by deactivating the target resource associated with the secondary content instance. Deactivating the secondary content instance may be useful in situations associated with high levels of granularity.

As a result, the deactivator API 2 may invoke a functional endpoint 304 associated with deactivating the placement, providing a placement identifier. An example of this functional endpoint may be /deactivate/secondary content instance, /deactivate/creative instance, or any other API endpoints for deactivating secondary content instances. In response to the deactivator API 2 invoking the functional endpoint associated with deactivating the secondary content instance via a secondary content instance API (block 306), an API associated with the secondary content provider 12 sends the deactivator API 2 code 307 containing data indicative of the secondary content instance status after a deactivation attempt. The code 307 may be an XML, string. Based on the data received from the API associated with the secondary content provider 12, the deactivator API 2 may validate the status of the secondary content instance. If the deactivator API 2 receives an inactive status tag such as "IN_ACTIVE" associated with the secondary content instance, then the deactivator API 2 was successful in deactivating the secondary content instance that is associated with the problematic secondary content. However, if the deactivator API 2 receives an active status tag such as "ACTIVE" associated with the secondary content instance, then the deactivator API 2 was not successful in deactivating the secondary content instance that contains the problematic secondary content. Additionally, if the deactivator API 2 is unsuccessful in deactivating the secondary content instance that contains the secondary problematic content, it may also provide information regarding any errors found in the process of deactivating the secondary content. At this point the deactivation is complete, as indicated by block 308.

Any particular target resource with a particular level of granularity (e.g., secondary content instance, secondary content, secondary content unit, or placement) may be deactivated in order to deactivate the problematic secondary content. As mentioned previously, the deactivator API 2 may request to deactivate the problematic secondary content based on a combination of granularity levels. For example, deactivating via two or more levels (e.g., the secondary content instance, secondary content, secondary content unit, or the placement). In such an embodiment, the deactivator API 2 may request to deactivate either the secondary content instance, the secondary content, the secondary content unit or, alternatively, the placement as a failover. The order in which a target resource is deactivated may vary when attempting deactivation of a particular target resource with a varying level of granularity as a failover. For example, in some instances, the order may be determined based upon rules set by an administrator of the system 400. The order may be from the highest level of granularity to the lowest level of granularity or may be any other order that suits the particular target resources to be deactivated.

Figure 8:
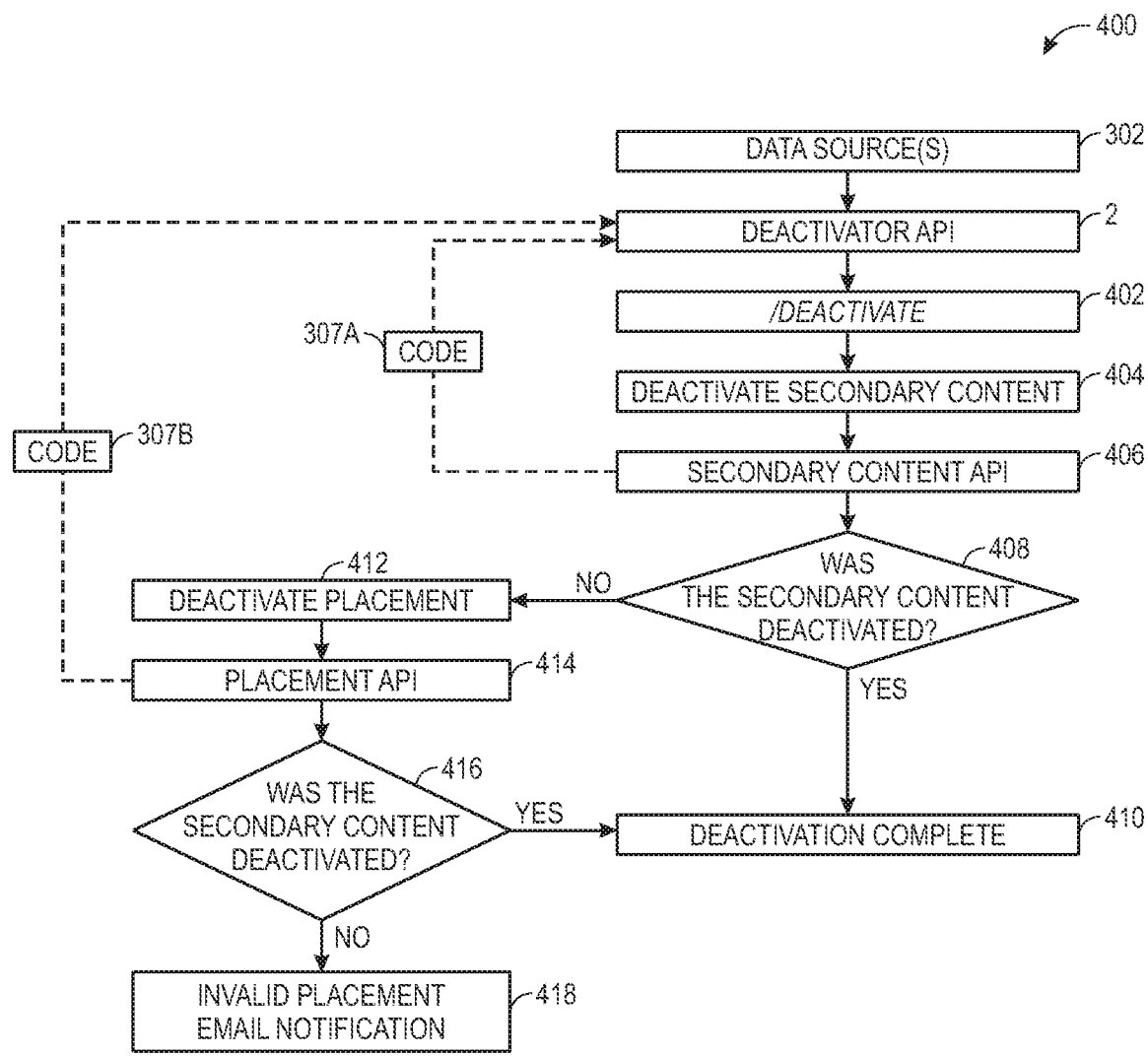
FIG. 8 is a block diagram associated with deactivating the problematic secondary content based on one or more target resources associated with varying levels of granularity, in accordance with an embodiment of the present disclosure.

Turning to FIG. 8, system 400 depicts a failover example, in which the problematic secondary content is deactivated by deactivating a target resource via deactivation of a secondary content or, as an alternative, a placement as a failover. Based on an indication of the problematic secondary content (e.g., as determined via one or more data sources 302), the deactivator API 2, may request the secondary content provider to deactivate the problematic secondary content.

As a result, the deactivator API 2 may invoke a functional endpoint 402 associated with deactivating either the secondary content or, alternatively, the placement as a failover, when the secondary content deactivation fails. An example of this functional endpoint may be /deactivate. In turn, the deactivator API 2 may attempt to deactivate the secondary content first, as indicated by block 404. In response to the deactivator API 2 attempting to deactivate the secondary content via the secondary content API 406, an API associated with the secondary content provider 12 sends the deactivator API 2 code 307A containing data indicating a status of the secondary content. The code 307A may be an XML string. A determination is made as to whether the secondary content was deactivated (decision block 408). If the deactivator API 2 receives an inactive status tag such as "IN_ACTIVE" associated with the secondary content, then the deactivator API 2 was successful in deactivating the secondary content that was identified as problematic (block 410). However, if the deactivator API 2 receives an active status tag such as "ACTIVE" associated with the secondary content, then the deactivator API 2 was not successful in deactivating the secondary content that was identified as problematic and may provide information regarding any errors found in the process of deactivating the secondary content.

As a result, if the deactivator API 2 is unsuccessful in deactivating the secondary content that was identified as problematic, then an attempt to deactivate the placement is performed, as indicated by block 412. In response to the deactivator API 2 attempting to deactivate the placement via the placement API (block 414), an API associated with the secondary content provider 12 sends the deactivator API 2 a code 307B containing data indicative of the placement status. The code 307B may be an XML, string. Based on the data received from the API associated with the secondary content provider 12, the deactivator API 2 may validate the status of the placement (block 414). If the deactivator API 2 receives an inactive status tag such as "IN_ACTIVE" associated with the placement, then the deactivator API 2 was successful in deactivating the placement that contains the problematic secondary content (block 416). However, if the deactivator API 2 receives an active status tag such as "ACTIVE" associated with the placement, then the deactivator API 2 was not successful in deactivating the placement containing the problematic secondary content and may provide information regarding any errors found in the process of deactivating the secondary content. In some embodiments, the deactivator API 2 may send this information regarding errors and the invalid placement via a notification such as an email (block 418).

In some embodiments, the API associated with the secondary content provider 12 may not send the deactivator API 2 code containing data about either the secondary content or the placement the first time, preventing the deactivator API 2 from validating the status of the secondary content or the placement. As a result, the deactivator API 2 may call the API associated with the secondary content provider 12 again to validate the status of the secondary content or the placement. In another embodiment, after the problematic secondary content has been deactivated, the deactivator API 2 (or a separate API) may replace the problematic secondary content with another secondary content after being prompted from the API associated with the secondary content provider 12.

In a further embodiment, along with the deactivator component 2, an activator component may be incorporated within the system 50. The activator component may be responsible for activating certain problematic secondary content that had been deactivated based on being prompted from the API associated with the secondary content provider 12. In one embodiment, the confidence tool 4 may be requested to pulse the secondary content again before re-activating the secondary content. The activator component may activate problematic secondary content on a periodic basis (hourly, daily, or any other suitable time period) after the confidence tool 4 has pulsed the secondary content. The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A deactivator component stored on a non-transitory, machine-readable medium, comprising code to:
   receive data via one or more data sources, the data comprising one or more of:
      an indication of one or more changes to available content, wherein the one or more changes are outside of one or more threshold specifications associated with one or more content presentation services;
      a content playback report indicative of an actual amount of playback of the available content and an expected amount of playback of the available content; or
      a content quality of experience (QoE) indication indicative of whether content statistics meet the one or more threshold specifications associated with the one or more content presentation services separate from the deactivator component;
   identify a problematic content based on the data; and
   in response to identifying the problematic content, provide a request, to a content provider, to deactivate the problematic content for use in subsequent provision.

2. The deactivator component of claim 1, wherein the data comprises the indication of the one or more changes to the available content, and wherein the indication of the one or more changes to the available content is generated by a confidence tool configured to determine changes to the available content.

3. The deactivator component of claim 2, wherein the one or more changes comprise one or more bit rate changes, one or more resolution changes, or both.

4. The deactivator component of claim 2, configured to request the confidence tool to pause determining changes to the problematic content upon providing the request to deactivate the problematic content.

5. The deactivator component of claim 1, wherein the data comprises the content playback report, generated by a prefetch reporting service.

6. The deactivator component of claim 1, wherein the data comprises the content quality of experience (QoE) indication, wherein the QoE indication is based upon one or more video start times, one or more buffering ratios, one or more video start failures, or any combination thereof associated with the available content.

7. The deactivator component of claim 1, configured to deactivate the problematic content based on a target resource defined by an identifier of: the problematic content, a placement associated with the problematic content, a content unit associated with the problematic content, a particular instance of playback of the problematic content, or any combination thereof.

8. The deactivator component of claim 7, wherein the target resource is defined by the identifier of the placement, the placement comprising an order associated with one or more available content in a content stream.

9. The deactivator component of claim 7, wherein the target resource is defined by the identifier of the content unit, the content unit comprising one or more available content with a specified order in the placement.

10. The deactivator component of claim 7, wherein the target resource is defined by the identifier of the problematic content.

11. The deactivator component of claim 7, wherein the target resource is defined by the identifier of the particular instance of playback of the problematic content.

12. The deactivator component of claim 1, wherein the code to deactivate the problematic content further comprises code to:
attempt to deactivate the problematic content based on a content identifier or on a content unit identifier; and
if the attempt is unsuccessful, deactivate a placement associated with the problematic content based on a placement identifier.

13. A system, comprising:
one or more data sources, generating data associated with available content, the data comprising:
an indication of one or more changes to the available content, wherein the one or more changes are outside of one or more threshold specifications associated with one or more content presentation services,
a content playback report indicative of an actual amount of playback of the available content and an expected amount of playback of the available content,
a content quality of experience (QoE) indication indicative of whether content statistics meet the one or more threshold specifications associated with the one or more content presentation services, or any combination thereof; and
a deactivator service computer separate from the one or more content presentation services, wherein the deactivator service computer is configured to:
receive the generated data associated with the content;
identify, based upon the received data, problematic content; and
in response to identifying the problematic content, provide a request, to a content provider, to deactivate the problematic content for use in subsequent provision.

14. The system of claim 13, comprising a confidence service, configured to identify the available content as problematic content when the one or more changes do not meet the one or more threshold specifications associated with the one or more content presentation services.

15. The system of claim 14, comprising one or more computers, separate from the deactivator service computer, configured to provide the confidence service.

16. The system of claim 14, wherein the deactivator service computer is configured to request the confidence service to pause pulsing of the problematic content until an indication that problems with the available content have been resolved has been received.

17. The system of claim 13, further comprising the content provider, wherein the content provider is configured to schedule the available content to be presented via the one or more content presentation services.

18. A method for deactivating problematic content, comprising:
receiving, via a deactivator service running on a computer, data associated with available content, the data comprising:
an indication of a problematic change to the available content, wherein the problematic change is outside of one or more threshold specifications associated with one or more content presentation services,
a content playback report, indicating a problematic playback of the available content based on an actual amount of playback of the available content and an expected amount of playback of the content,
a content quality of experience (QoE) indication, indicating a problematic QoE associated with the content, wherein the problematic QoE comprises content statistics that are outside of the one or more threshold specifications associated with the one or more content presentation services, or any combination thereof;
identifying, via the deactivator service, problematic content of the content, based on the data received, wherein the deactivator service is separate from the one or more content presentation services; and
requesting, via the deactivator service, a content provider to deactivate the problematic content for use in subsequent provision.

19. The method for deactivating problematic content of claim 18, wherein requesting the content provider to deactivate the problematic content further comprises accessing a particular endpoint of a set of endpoints of an application programming interface (API) of the content provider, wherein the particular endpoint is determined based upon a particular granularity indicated by the deactivator service.

20. The method for deactivating problematic content of claim 18, wherein the deactivator service is configured to generate and provide feedback indicating why the problematic content is problematic, based at least in part upon the data.

* * * * *

UNITED STATES PATENT AND TRADEMARK OFFICE
CERTIFICATE OF CORRECTION

| | | |
|---|---|---|
| PATENT NO. | : 11,122,309 B2 | Page 1 of 1 |
| APPLICATION NO. | : 16/730460 | |
| DATED | : September 14, 2021 | |
| INVENTOR(S) | : Michael Levin et al. | |

It is certified that error appears in the above-identified patent and that said Letters Patent is hereby corrected as shown below:

On the Title Page

Item (72), Titled "Inventors:" please add --Rebecca Mason, Merrick, NY (US)--.

Signed and Sealed this
Fifteenth Day of July, 2025

Coke Morgan Stewart
*Acting Director of the United States Patent and Trademark Office*